UNITED STATES PATENT OFFICE.

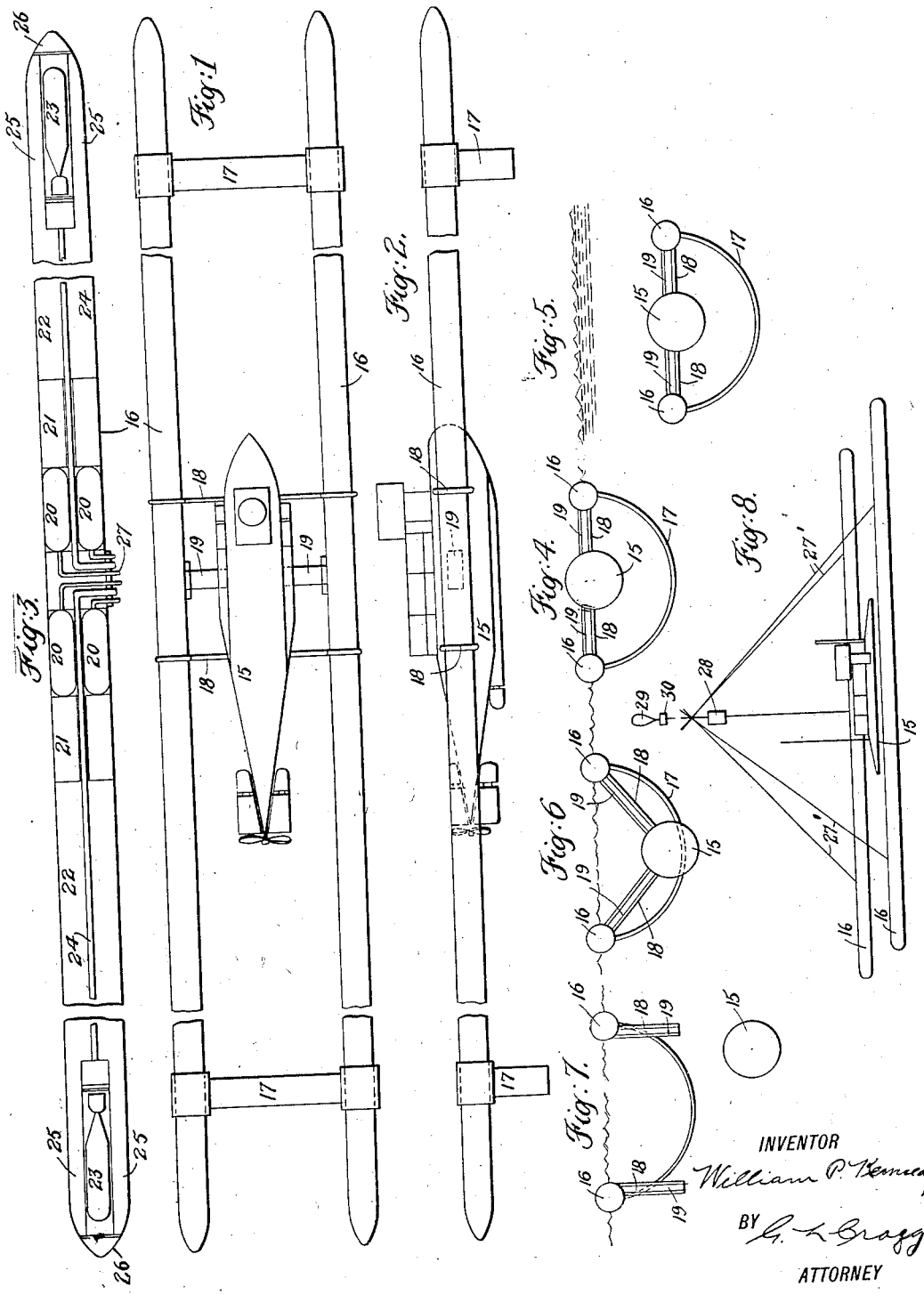

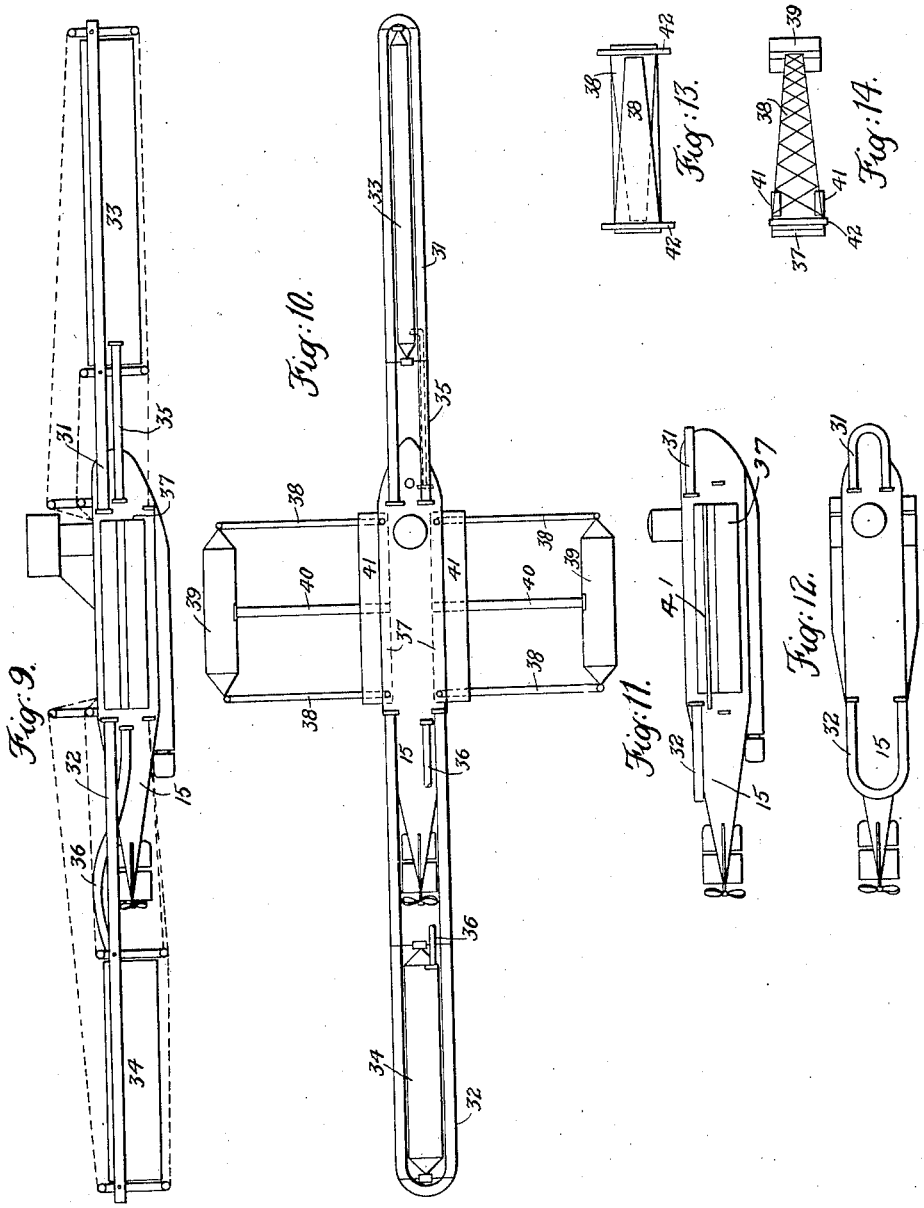

WILLIAM P. KENNEDY, OF NEW YORK, N. Y.

SUBMARINE.

1,358,081.  Specification of Letters Patent.  Patented Nov. 9, 1920.

Application filed July 26, 1917. Serial No. 182,855.

*To all whom it may concern:*

Be it known that I, WILLIAM P. KENNEDY, a citizen of the United States, residing at New York, in the county of New York and State of New York, have invented a certain new and useful Improvement in Submarines, of which the following is a full, clear, concise, and exact description.

My invention relates to submarine boats designed to operate at the surface of the water or below the surface of the water.

In practising my invention I form a composite boat comprising the submarine proper or the main hull thereof and supplemental floats or hulls that are extraneous to the main hull of the submarine. These floats furnish one of the factors in determining the buoyancy to which the submarine is subject and preferably constitute supplemental extraneous hulls by being made hollow. These hollow floats or supplemental hulls may constitute containers supplementing the containing space of the main submarine hull. Compressed air may be contained in these supplemental hulls and may be supplied therefrom to the main hull by piping. Some of the supplies for the submarine boat may also be contained in the supplemental hulls such, for example, as some of the torpedoes and in fact the supplemental hulls may be so equipped that torpedoes may be discharged therefrom with the aid of regulating equipment carried upon the main hull.

Thus in certain aspects of my invention the supplemental floats really constitute supplemental boats that are operatively coupled with the main boat and are drawn thereby through the water, apparatus upon the main and supplemental boats being operatively associated or interconnected through suitable means such as the piping for compressed air and electrical conductors passing through the main and supplemental boats to couple electrical equipment thereon.

As I have practised the invention the supplemental boats or hulls serve to stabilize the main boat and make more serviceable small submarines for scouting and observation purposes as well as for offensive and defensive operations in war time. This is particularly so where these stabilizing hulls are of greater length than the submarine itself. The main boat is desirably separably coupled with the supplemental boats so as to be navigable unencumbered thereby in the event of necessity.

The foregoing and other characteristics of my invention will be fully set forth by a description of the preferred embodiments of the invention shown in the accompanying drawings and in which drawings Figure 1 is a plan view illustrating one embodiment of the invention; Fig. 2 is a side view of the arrangement illustrated in Fig. 1; Fig. 3 is a diagrammatic view illustrating the contents which may be provided in a supplemental hull; Fig. 4 is an end view showing the submarine projecting above the surface of the water; Fig. 5 shows the entire composite boat submerged; Fig. 6 shows the submarine submerged while the supplemental hulls float awash at the surface; Fig. 7 shows the submarine uncoupled and displaced from the supplemental hull equipment; Fig. 8 is a diagrammatic view illustrating some of the uses to which the composite boat of my invention may be put; Fig. 9 is a side view illustrating another embodiment of the invention; Fig. 10 is a plan view of the structure shown in Fig. 9; Fig. 11 is a side view of a structure similar to that shown in Fig. 10 with certain supporting portions collapsed and withdrawn partially within the submarine; Fig. 12 is a plan view of the structure shown in Fig. 11; and Figs. 13 and 14 illustrate some of the supplemental submarine equipment.

Like parts are indicated by similar characters of reference throughout the different figures.

The submarine or submersible boat 15 is desirably in itself a complete entity in order that it may be freed from the supplemental hulls, buoyancy chambers, or floats 16 that are extraneous thereto and which serve to stabilize the submarine 15 when coupled therewith. These floats 16 are preferably in the nature of supplemental boats and are sufficiently long to stabilize the submarine in the directions of its length and beam. The invention, however, is not to be limited to the separability of the main hull of the submarine proper from the extraneous hulls 16 that supplement the same. The supplemental hulls 16 are desirably in permanent assembly, being united by end struts 17. When the submarine proper 15 is to be in separable relation with the supplemental hulls 16 the struts 17 are desirably semicircular in order that the submarine or submersible boat 15 when moving along the surface may travel longitudinally of and between the hulls 16 to clear them, the submarine 15 moving over one or the other of the struts 17 in leaving association with the hulls 16. Fig. 7 shows the submarine 15 apart from the supplemental hull equipment. The submarine, when sufficiently elevated, may readily enter between the hulls 16 by passing over one or the other of the struts 17. The means by which the submarine 15 is separably connected with the hulls 16 reside in the braces 18 and 19 which may be permanently assembled with the hulls 16 and separably attached to the submarine 15. Operative connection between the submarine 15 and the storage tanks, electrical or other equipment carried in the hulls 16, is effected by the tubular or electric cable connection 19, which may be permanently assembled with the hull 16 and separably attached to the submarine 15. The braces 18 are connected at their outer ends about the hulls 16 in order that they may maintain assembly between the hulls 16 and the submarine 15 while the submarine is elevated and in various stages of submergence. The devices 18 are desirably sufficiently rigid and normally serve rigidly to couple the main hull of the submarine 15 and the supplemental hulls 16. When the submarine and its supplemental hull equipment are in assembly they may proceed in any direction with the submarine 15 either at the surface of the water (Fig. 4) or below the surface of the water with the hull 16 afloat (Fig. 6) or the entire combination may navigate completely submerged as illustrated in Fig. 5. In case of emergency, the submarine 15 may submerge without parting from its supplemental hull equipment (Figs. 5 and 6) or may submerge after leaving its supplemental equipment (Fig. 7) and, whether submerged or not, the submarine 15 may propel itself in any direction and cause its supplemental hull equipment 16 to travel therewith when attached thereto.

The floats 16 not only serve to contribute to the buoyancy and stability of the submarine 15 but also desirably serve to supplement the storage capacity of the submarine on which account these floats are made hollow to constitute them supplemental hulls that are extraneous to the main hull of the submarine. For example, the supplemental hulls, or parts thereof, may contain compressed air to be supplied for use in the submarine 15 through the connection (made hollow for the purpose) that couple these hulls with the submarine 15. This compressed air may serve any well known or suitable purpose; it may operate compressed air equipment; or it may serve to eject water from ballast tanks, etc.

The supplemental hulls 16 may be adapted to carry submarine equipment as illustrated in Fig. 3. In this figure there are illustrated fuel tanks 20, fresh water tanks 21, compressed air compartments 22, torpedoes or other projectiles 23, conduits 24 extending between the torpedoes and the submarine through which water or compressed air and electrical energy conductors may be passed to control and effect emergence of the torpedoes and to start the propulsion mechanism of the torpedoes. The compensating tanks 25 are to be filled with water to compensate for the weight of the discharged torpedoes. The heads 26 permit the emergence of the torpedoes in the usual way. Pipes or conduits 27 also establish connection between the hulls 16 and the submarine through tubes or flexible wire cables carried in 19 for purposes of control or otherwise. This tubular or wire connection 19 may be connected or disconnected from submarine 15 by means of attachment plugs or couplings somewhat similar to those used in railway train connections of this character arranged to meet the conditions of submarine operation. The floats or hulls 16 may also serve the purpose illustrated in Fig. 8 where they are shown as serving the purpose of supporting the inclined masts $27^1$ (raised or lowered by ordinary ship rigging not shown) that converge and serve where converged to support an observation basket or station 28. These masts $27^1$ may also serve as an anchorage for the kite 29 to which may be attached a camera 30 for periodically taking pictures as is now customary in reconnoitering. These masts $27^1$ may also sustain the antennæ of wireless telegraph equipment and also may sustain electric lights employed for visual signaling. These masts may also carry sails by which the composite boat may be propelled when the usual propelling energy is exhausted or is to be conserved.

Reference will now be had to Figs. 9 et seq. The submarine 15 is shown in certain of these figures as being equipped with the U-shaped supports 31 and 32 that are disposed in a horizontal plane and which have telescoping engagement with the hull of the submarine 15 whereby they may be withdrawn into the submarine to a very great extent, and if desired, these supports may be sufficiently short or formed in telescoping sections to enable them to be contracted to occupy the space indicated by Fig. 11. The support 31 is of a width to be receivable between the sides of the support 32 when these supports are drawn into the submarine. These supports carry removable floats, buoyancy chambers or containers 33, 34 respectively fore and aft to regulate the buoyancy leverage of the submarine in the direction of its length. Said buoyancy chambers are attached to the supports 31, 32 when they are extended. Such floats or buoyancy chambers may be in the nature of fabric or skin bags of bellows-like construction so that when they are deflated they will become flat or collapsed. When the bags are collapsed they may lie upon the deck of the submarine 15. Air may be forced into and drawn from these bags through air pipes 35, 36 that establish communication between these bags and the interior of the submarine, the bags being inflated or deflated to an extent that will secure the desired regulation of the buoyancy leverage to aid in the navigation of the submarine. These bags may be fully inflated when the composite boat is stationary or is making slow speed and may be increasingly deflated correspondingly to increased speeds. The sides of the submarine carry compartments 37 for inclosing the extensible and collapsible side members 38 at whose outer ends the floats, containers or supplemental hulls 39 are carried. If these floats are hollow they may be brought into communication with the main hull of the composite boat (the hull of the submarine) by means of the pipes 40. The hulls 39 may carry air under pressure as do the hulls 16. The doors 41 are made to lock the extensible side members 38 rigidly in position. The elements 38, 39 may be unrigged in their collapsed or folded condition.

In Fig. 13 the side members 38 are shown folded over each other in the compartment countersunk into the side of the hull. They are each attached to and rotated by shafts 42 which extend into the submarine 15, so as to afford the attachment of means which can be employed to rotate or extend these side members.

Fig. 14 is a vertical cross sectional view looking fore and aft, which shows the position of the side members 38 when extended from the compartments 37 and connected to the flexible air containers 39. This view shows that the doors 41 have inside flanges engaged with the side members which serve to hold them in rigid position.

The supporting frames 31, 32 may be made of pressed steel channel or steel tubing and may be formed in subdivisions in telescoping or sliding relation to each other.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A submarine boat in combination with a detachably applicable supplemental hull extraneous to the hull of the submarine boat and coupled therewith.

2. A submarine boat in combination with a detachably applicable supplemental hull extraneous to the hull of the submarine boat and rigidly coupled therewith.

3. A submarine boat in combination with a detachably applicable supplemental hull extraneous to the hull of the submarine boat; and piping joining said hulls.

4. A submarine boat in combination with a detachably applicable supplemental hull extraneous to the hull of the submarine boat; and piping joining said hull, parts of the boat equipment being carried by said hulls.

5. A submarine boat in combination with a detachable float extraneous to the hull of the submarine boat and coupled therewith and means whereby the buoyancy of the float may be regulated.

6. A submarine boat in combination with a detachable float extraneous to the hull of the submarine boat and rigidly coupled therewith and means whereby the buoyancy of the float may be regulated.

7. A submarine boat in combination with a detachable float extraneous to the hull of the submarine boat and rigidly and separably coupled therewith and means whereby the buoyancy of the float may be regulated.

8. A submarine boat in combination with detachable floats located fore and aft and upon each side of the submarine boat and coupled therewith and having means for regulating their buoyancy.

9. A submarine boat in combination with detachable floats located fore and aft and upon each side of the submarine boat and rigidly coupled therewith and having means for regulating their buoyancy.

10. A submarine boat in combination with a separable structure of two connected floats between and with which the submarine boat is coupled.

11. A submarine boat in combination with a separable structure of two connected floats between and with which the submarine boat is separably coupled.

12. A submarine boat in combination with a separable structure of two connected floats between and with which the submarine boat is rigidly coupled.

13. A submarine boat in combination with a separable structure of two connected floats between and with which the submarine boat is rigidly and separably coupled.

In witness whereof, I hereunto subscribe my name this 23rd day of July, A. D., 1917.

WILLIAM P. KENNEDY.